Aug. 19, 1969     F. H. BERNSTEIN     3,462,615

PROPORTIONAL CONTROL SYSTEM

Filed March 10, 1967

INVENTOR.
FRANK H. BERNSTEIN
BY
William Grobman

United States Patent Office 3,462,615
Patented Aug. 19, 1969

3,462,615
PROPORTIONAL CONTROL SYSTEM
Frank H. Bernstein, East Riverdale, Md., assignor to Singer-General Precision Inc., Binghamton, N.Y., a corporation of Delaware
Filed Mar. 10, 1967, Ser. No. 622,153
Int. Cl. H03k 17/78, 1/12, 3/42
U.S. Cl. 307—243                                        2 Claims

ABSTRACT OF THE DISCLOSURE

In many electrical operations it is desirable to have a system for controlling the current or potential output from one source in proportion to an electrical signal from another source. This invention relates to a proportional control system for achieving this result. The control system includes a first attenuator which is varied by the control signal to control a device which determines the impedance of a second attenuator. As the first attenuator is varied, so should the second attenuator also vary. In the embodiments disclosed, the two attenuators are light-sensitive resistors whose impedances are controlled by the intensity of light from a small electric lamp. The two photo-sensitive resistors and the lamp may be enclosed in a housing as a single module. The control circuit for the electric lamp uses one of the photo-sensitive resistors in a feedback path to stabilize the current flow through the lamp. If the two resistors are substantially the same, the resistance of the second photo-sensitive resistor will vary with the lamp output and control the output current from a second source.

---

This invention relates to electrical control systems and, more particularly, to systems for controlling an electrical output in proportion to an electrical input signal.

In the past, it has often been desirable in many applications to control the electrical output of one power system by an electrical input signal from another separate power system. As an example, it is sometimes desirable to control the speed or position of an electric motor driven from a fairly large power source by the electrical signal generated by a very small power source, such as a computer system. One type of control used in the past has been the amplification of the control signal to the large power output required by the electrical motor. Another such system has been the utilization of an electrical control signal to control the phase relationship between an error signal and a reference in an alternating current power system for controlling the position or speed of rotation of an alternating current motor. In these past systems, almost regardless of the type, there have been problems of hunting, oscillations, and stabilization in general, as well as problems of linearity. The system of this invention solves many of these problems.

It is an object of this invention to provide a new and improved electrical control system for controlling the electrical output from one system by an input control signal of another.

It is another object of this invention to provide a new and improved electrical control system.

It is a further object of this invention to provide a new and improved electrical control system in which a controlled attenuator determines the amount of output energy from a power source.

It is still another object of this invention to provide a new and improved linear attenuator controllable by an electrical signal from one source for determining the output of another electric power source.

Figure 1:
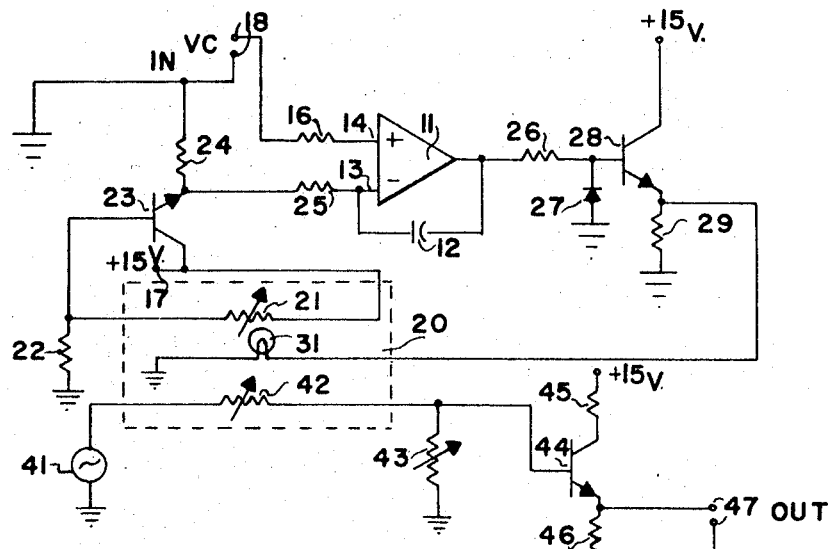
Figure 2:
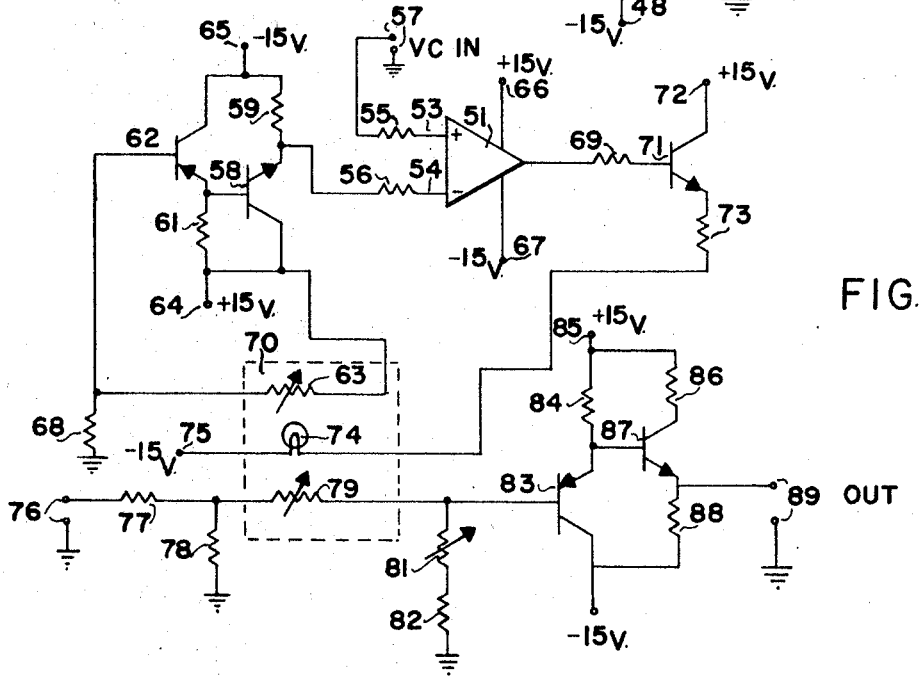

Other objects and advantages of this invention will become more apparent as the following description proceeds, which description should be considered together with the accompanying drawings in which:

FIG. 1 is an electrical schematic diagram of one embodiment of this invention; and
FIG. 2 is an electrical schematic diagram of a second embodiment of this invention.

Referring now to the drawings in detail and, more particularly, to FIG. 1, the reference character 11 designates an operational amplifier bypassed by an integrating capacitor 12 which is connected from its output to its negative input. The operational amplifier 11 comprises a single output and a pair of inputs 13 and 14. The input 14 is the non-inverting input, and the input 13 is the inverting input. A voltage control signal is applied to input terminals 18 and through a limiting resistor 16 to the non-inverting input 14 of the amplifier 11. The output from the amplifier 11 is connected through a resistor 26 to the base electrode of a transistor 28 which also comprises an emitter electrode connected through a resistor 29 to ground and a collector electrode connected to a source of positive potential. A clamping diode 27 is connected between the base electrode of the transistor 28 and ground. The output from the transistor 28 is taken from the emitter electrode across the load resistor 29 and is applied to one end of the filament of an electric lamp 31, the other end of which is grounded. A feedback path is provided from a photo-sensitive resistor 21 placed in light-receiving relation with the lamp 31. One end of the resistor 21 is connected to the base electrode of a transistor 23 across a load resistor 22, the other end of which is connected to ground. The other end of the resistor 21 is connected to a terminal 17 through which a source of positive potential also is applied to the collector electrode of the transistor 23. The emitter electrode of the transistor 23 is connected through a load resistor 24 to ground and supplies an output potential across the load resistor 24 and through a resistor 25 to the inverting input 13 of the amplifier 11.

Also in light-receiving relationship with the lamp 31 is a second photo-sensitive resistor 42 one end of which is connected to a source of alternating current 41. The other end of the resistor 42 is connected across a load potentiometer 43, which has one end grounded, to the base electrode of a transistor 44. The collector electrode of the transistor 44 is connected through a limiting resistor 45 to a source of positive potential, and the emitter electrode of the transistor 44 is connected through a load resistor 46 to a terminal 48 to which a source of negative potential is applied. The output signal is taken from a pair of terminals 47, one of which is grounded and the other of which is connected to the junction of the load resistor 46 and the emitter electrode of the transistor 44. One side of the alternating current source 41 is grounded.

In operation, a voltage contral signal is applied to the input terminals 18. This signal may be derived from any suitable source. In some applications, the voltage control signal may originate in a digital computer and be directly derived from a digital-to-analog converter connected to the output of that computer. In analog systems, the control voltage may be directly derived from the electrical control system. But no matter how the voltage signal is derived, the purpose of the signal is to control the electrical power applied to an output device by the source 41. In this type of application, proportional following by the output signals at terminals 47 of the input signals at terminals 18 is very desirable. In many of the past systems direct or linearly proportional following was virtually impossible to achieve. The use of a light and photocell module such as that shown at 20 was common in systems of this nature, but the linearity of response depended to a great extent upon the degree of identity between the two photo-resistors 21 and 42. Therefore, unless the photo-resistors were carefully selected and matched, the range over which proportionality was achieved was often quite small.

To overcome some of the problems inherent in the lack of constant proportionality in systems of this nature, the voltage control signal applied to the input terminals 18 is applied between the non-inverting input 14 of the amplifier 11 and ground while a feedback signal is applied to the inverting input 13 of the same amplifier 11. The output of the amplifier 11 is applied to the base electrode of the transistor 28 across the diode 27 to limit the excursions of the input to the transistor 28. The output of the transistor 28 determines the amount of current flowing through the light bulb 31. Lamp 31 is shown as a filament lamp; however, in those cases where it is desirable, a neon or other gas-filled lamp may also be used. The photo-resistor 21 lies in a position to receive light from the lamp 31, and has applied across it, and the load resistor 22 in series, a source of electrical energy. As the resistance of the photo-resistor 21 is varied by the light impinging upon it from the lamp 31, whose light output is, in turn, controlled by the output of transistor 28, the voltage drop across the resistor 22 is varied. This varies the voltage applied to the base electrode of the transistor 23 whose output is applied to the inverting input 13 of the amplifier 11. The amplifier 11 has the integrating capacitor 12 connected from its output to its inverting input 13. Thus, the output of the amplifier 11 becomes the integrated difference between the voltage control signal applied to its input 14 and the feedback signal developed by the photo-resistor 21 applied to its input 13. As the output from the amplifier 11 goes up, the light output from the lamp 31 also goes up, and the signal applied to the two inputs 13 and 14 are in the same direction. This means that the resultant output of the amplifier 11 tends to stabilize since the input signals applied to the two inputs 13 and 14 become more similar. The system tends to null. In this manner, the resistor 21 serves as an element in a feedback path for the amplifier 11 by responding to the output of the amplifier to generate a feedback signal tending to overcome the control signal input in order to stabilize the light bulb output intensity at a value which is proportional to the input signal applied at the terminals 18. Since the amount of light impinging upon the photo-resistor 42 is proportional to the amount of light impinging upon the photo-resistor 21, the control exerted by the photo-resistor 42 follows the control exerted by the resistor 21, and the control extered by the resistor 21 depends upon the input signal. The variations in the resistance of the resistor 42 determines the current which flows from the source 41 to the output terminals 47 through the transistor 44. A potentiometer 43 is connected into the circuit which includes the photo-resistor 42 to calibrate the system so that the resistors 42 and 21 track closely. The potentiometer 43 may, of course, be placed in series with the circuit or may be replaced by a more complex network if this is found to be desirable to further increase the accuracy.

This system has the advantage over many other systems devised for a similar purpose of generating a feedback signal which is continually modified by the system so that it becomes more and more similar to the input control signal. This feedback signal controls the output circuitry so that the output is proportional to the feedback signal and the feedback signal becomes virtually identical to the input control signal. Means, in the form of adjustable resistors or resistor networks are provided to adjust the slopes of the two photo-resistors so that they track more closely. In addition, since the input signal and the feedback signal are operated upon by the same components, they are affected the same by the circuit. This results in a feedback signal which even more closely follows the input signal without loading the input.

A somewhat different embodiment of the same basic invention is shown in schematic diagram form in FIG. 2. An amplifier 51 has a pair of inputs, a non-inverting input 53 connected through a limiting resistor 55 to one input terminal 57, and an inverting input 54. A pair of terminals 66 and 67 are adapted to be connected to sources of direct current to energize the amplifier 51. The output of the amplifier 51 is connected through a limiting resistor 69 to the base electrode of a transistor 71, the collector electrode of which is connected to a terminal 72 to which a source of positive potential is connected, and the emitter electrode of which is connected through a limiting resistor 73 and a filament lamp 74 to a terminal 75, to which is connected a source of negative potential. In light-receiving relation with the lamp 74, in a housing 70, is a light-sensitive resistor 63 which has one end connected across a grounded load resistor 68 to the base electrode of a transistor 62. The collector electrode of the transistor 62 is directly connected to a terminal 65 to which is coupled a source of negative potential, and the emitter electrode of the transistor 62 is connected through a load resistor 61 to a terminal 64 to which is connected a source of positive potential. Across the load resistor 61 the output from the transistor 62 is taken and is applied to the base electrode of a transistor 58 which has its emitter electrode connected through a load resistor 59 to the terminal 65 and its collector electrode connected to the terminal 64. The other side of the photo-sensitive resistor 63 is also connected to the terminal 64. From the transistor 58 an output is taken across the load resistor 59 and is applied through a limiting resistor 56 to the inverting input 54 of the amplifier 51.

In the controlled output circuit, a pair of terminals 76 are provided for connection to a source of electrical power, not shown. The source is connected in series with a scaling resistor 77 to one side of a photo-sensitive resistor 79, which is in the housing 70 in light-receiving relationship with the lamp 74. The other side of the resistor 79 is connected across the series combination of a potentiometer 81 and a resistor 82 to the base electrode of a transistor 83. The emitter electrode of the transistor 83 is connected through a load resistor 84 and a terminal 85 to a source of positive potential, and the collector electrode of the transistor 83 is directly connected to a source of negative potential. The output from the transistor 83 is taken across the load resistor 84 and is applied to the base electrode of a transistor 87 whose collector electrode is connected through a limiting resistor 86 to the terminal 85, and whose emitter electrode is connected through a load resistor 88 to the source of negative potential. The controlled output is taken across the resistor 88 from the pair of terminals 89.

The basic operation of the system of FIG. 2 is essentially the same as that of FIG. 1. A control voltage VC is applied to the input terminals 57 and thereby to the non-inverting input 53 of the amplifier 51. The output of the amplifier 51 is applied through the limiting resistor 69 to the base electrode of the transistor 71, the output from which determines the current flow through the lamp 74. Again, as the current output from the transistor 71 varies, so does the current flow through the lamp 74 and the light which strikes the photo-sensitive resistors 63 and 79. The resistor 63 is connected between a source of positive potential, at the terminal 64, and ground through the resistor 68, so that the current flowing from the terminal 64 at any time is determined by the resistance of the resistor 63. This, in turn, determines the potential drop across the resistor 68, which potential drop is the input signal to the transistor 62. The transistor 58 is in cascade with the transistor 62 and its output is applied to the inverting input 54 of the amplifier 51. The transistor 62 is an NPN transistor and the transistor 58 is a PNP transistor, and these two are connected as shown to add to the stability of the system since one tends to compensate for environmental variations in the other and to provide a negligible offset error. The two transistors at the output, 83 and 87, are similarly of difference types and similarly connected for the same reason. The signal whose amplitude is determined by the photo-sensitive resistor 63 and the voltage control input signal applied to terminal 57 are of the same polarity and are differentially combined in the amplifier 51 so that the output applied through the transistor 71 to the lamp 74 is determined by the difference between these two signals. As the control signal varies, the current flow applied to the photo-sensitive resistor 63 and the subsequent signal applied to the other input of the amplifier 51 also varies, with the end result that the feedback signal, that applied to the inverting input 54, tends to approach the input signal VC. This produces a repeatable and stable equilibrium point for the intensity of the light being emitted from the lamp 74 at any value of the input control signal applied to terminal 57. Therefore, the light impinging upon the photo-sensitive resistor 79 is repeatable for any value of the input potential, and the control of the current from the power terminals 76 to the output terminals 89 is also proportionally related to the input signal.

The amplifier 51 in the circuit of FIG. 2 does not have an integrating capacitor connected across it as does the amplifier 11 of FIG. 1. This increases the rate of response of the circuit of FIG. 2 over that of the circuit of FIG. 1. In addition, as mentioned above, the paired transistors 62 and 58 in the feedback path and the paired transistors 83 and 87 in the output circuit compensate for variations in each other and also tend to produce a more stable and linear circuit. The potentionmeter 81 is used to change the slope of the resistor 79 and to compensate for variations between the two photo-sensitive resistors 63 and 79, and, as mentioned in connection with FIG. 1, it may be replaced by a series potentiometer or a more complex network if it is desirable. The resistor divider network comprised of fixed resistors 77 and 78 are used for scaling the output signal with respect to the applied control voltage signal. To simplify the drawings, many similar types of voltage sources are shown separately, but, it is, of course, understood that they all may be derived from a single such power source. While this invention has been shown in connection with a light and photocell control network, it is obvious that the system of this invention could be used with other diverse types of control systems, such as one using a heat generator and heat sensitive resistors.

This specification has described and illustrated a new and improved control system for controlling the output of one source of electrical energy linearly with respect to the value of energy from another source. It is realized that the above-description could indicate to others skilled in the art additional ways in which this invention could be utilized without departing from its spirit. It is, therefore, intended that this invention be limited only by the scope of the appended claims.

What is claimed is:

1. A control system for controlling the output of one source of electrical energy in proportion to the output from another source of electrical energy, said control system comprising a first electrical loop and a second electrical loop, said first electrical loop comprising a differential device having at least two inputs and one output, said differential device combining in opposition signals applied to its two inputs to produce at its output signal which is the difference between said two input signals, a first and a second circuit element, each of said circuit elements having impedance, a control means connected to the output from said differential device for controlling the impedances of said first and said second circuit elements in accordance with the output of said differential device, means for applying an input signal to one input of said differential device, means for connecting said first circuit element to the other input of said differential device, said second loop comprising a source of electrical energy and said second circuit element connected to said source to control the output thereof, whereby the amount of electrical energy from said source of said electrical energy is controlled by the output of said differential device, which output is determined by said input signal applied to said first input, and means for deriving output electrical energy from said source of electrical energy, said deriving means including a pair of transistors connected in cascade and arranged to compensate for variations in environmental conditions.

2. A control system for controlling the output of one source of electrical energy in proportion to the output from another source of electrical energy, said control system comprising a first electrical loop and a second electrical loop, said first electrical loop comprising a differential device having at least two inputs and one output, said differential device combining in opposition signals applied to its two inputs to produce at its output signal which is the difference between said two input signals, a first and a second circuit element, each of said circuit elements having impedance, a control means connected to the output from said differential device for controlling the impedances of said first and said second circuit elements in accordance with the output of said differential device, means for applying an input signal to one input of said differential device, means for connecting said first circuit element to the other input of said differential device, said second loop comprising a source of electrical energy and said second circuit element connected to said source to control the output thereof, whereby the amount of electrical energy from said source of said electrical energy is controlled by the output of said differential device, which output is determined by said input signal applied to said first input, a pair of transistors connected in cascade interposed between said first circuit element and the other input to said differential device, said pair of transistors comprising a transistor of each of two opposite types, and means for connecting said two transistors together in cascade to compensate for environmental changes in the system.

References Cited

UNITED STATES PATENTS

| | | | |
|---|---|---|---|
| 3,281,706 | 10/1966 | Morris et al. | 307—311 X |
| 3,281,723 | 10/1966 | Mercer | 307—311 X |
| 3,384,739 | 5/1968 | Connelly | 250—209 X |

JOHN S. HEYMAN, Primary Examiner

U.S. Cl. X.R.

250—209; 307—254, 297, 311; 330—30